US010358159B2

(12) United States Patent
Pekari

(10) Patent No.: US 10,358,159 B2
(45) Date of Patent: *Jul. 23, 2019

(54) STEERING WHEEL FOR A MOTOR VEHICLE AND PROCESS FOR PRODUCING A STEERING WHEEL

(71) Applicant: Schipek GmbH, Horb (DE)

(72) Inventor: Christoph Pekari, Eutingen (DE)

(73) Assignee: Schipek GmbH, Horb (DE)

( * ) Notice: Subject to any disclaimer, the term of this patent is extended or adjusted under 35 U.S.C. 154(b) by 350 days.

This patent is subject to a terminal disclaimer.

(21) Appl. No.: 14/990,195

(22) Filed: Jan. 7, 2016

(65) Prior Publication Data
US 2016/0129928 A1 May 12, 2016

Related U.S. Application Data

(63) Continuation of application No. 13/526,680, filed on Jun. 19, 2012, now Pat. No. 9,272,725.

(30) Foreign Application Priority Data

Jun. 22, 2011 (DE) .................. 10 2011 104 994

(51) Int. Cl.
B62D 1/06 (2006.01)
B62D 1/04 (2006.01)

(52) U.S. Cl.
CPC ............ B62D 1/06 (2013.01); B62D 1/046 (2013.01); Y10T 29/49488 (2015.01); Y10T 74/20834 (2015.01)

(58) Field of Classification Search
CPC .... B62D 1/11; B62D 1/06; B62D 1/04; B60R 21/02; B29L 2031/3047
See application file for complete search history.

(56) References Cited

U.S. PATENT DOCUMENTS 3,802,291 A 4/1974 Young, Jr. et al.
4,782,872 A 11/1988 Moschini
5,205,186 A 4/1993 Dräxlmaier, Sr.
(Continued)

FOREIGN PATENT DOCUMENTS

DE 1194273 A 6/1965
DE 8906358 U1 9/1989
(Continued)

OTHER PUBLICATIONS

EPO Translation of the Description of DE 102007028201 A1, Haart et al., Dec. 18, 2008. (Year: 2018).*
(Continued)

Primary Examiner — Daniel D Yabut
(74) Attorney, Agent, or Firm — Renner, Otto, Boisselle & Sklar, LLP

(57) ABSTRACT

A steering wheel for a motor vehicle, with a steering wheel base body and a jacket that comprises at least one strip surrounding the steering wheel base body on the outer circumference. A first free end of the at least one strip is held in position securely in a groove formed in the steering wheel base body. A second free end of the at least one strip is also held in position securely in a groove formed in the base body of the steering wheel. In addition, the invention concerns a process for the production of such a steering wheel.

19 Claims, 3 Drawing Sheets

(56) References Cited

U.S. PATENT DOCUMENTS

| | | | |
|---|---|---|---|
| 5,289,735 A | 3/1994 | Kato et al. | |
| 5,802,718 A | 9/1998 | Raetsen | |
| 6,079,292 A | 6/2000 | Raetsen | |
| 6,386,063 B1 | 5/2002 | Hayashi et al. | |
| 6,412,365 B1 | 7/2002 | Nagata et al. | |
| 6,668,683 B2 | 12/2003 | Fleckenstein | |
| 6,892,607 B2 | 5/2005 | Hayashi et al. | |
| 7,210,372 B2 | 5/2007 | Adachi et al. | |
| 7,741,581 B2 | 6/2010 | Kreuzer et al. | |
| 9,272,725 B2 * | 3/2016 | Pekari | B62D 1/046 |
| 2001/0023622 A1 | 9/2001 | Testa | |
| 2007/0153535 A1 | 7/2007 | Bostick | |
| 2008/0202282 A1 | 8/2008 | Bassett et al. | |
| 2009/0151506 A1 | 6/2009 | Haart et al. | |
| 2009/0178509 A1 | 7/2009 | Seidl | |
| 2010/0236353 A1 | 9/2010 | Valentine et al. | |

FOREIGN PATENT DOCUMENTS

| | | |
|---|---|---|
| DE | 60017640 T2 | 3/2006 |
| DE | 102005061697 A1 | 7/2007 |
| DE | 102007028201 A1 | 12/2008 |
| EP | 1069023 A1 | 1/2001 |
| EP | 1939063 A1 | 7/2008 |
| EP | 1964751 A2 | 9/2008 |
| GB | 980673 A | 1/1965 |
| JP | 2009126448 A | 6/2009 |
| WO | WO 2006/127835 A2 | 11/2006 |

OTHER PUBLICATIONS

EPO Translation of the Description of EP 1069023 A1, Guyader, Jan. 17, 2001. (Year: 2018).*

PCT/DE2012/100178 International Preliminary Report on Patentability dated Jun. 4, 2013 (Including English Translation).

Machine translation of description EP1069023. European Patent Office: Espacenet Patent Search. Jan. 26, 2014. http://translationportal.epo.org/emtp/translate/?ACTION=description-retrieval&COUNTRY=EP&ENGINE=google&FORMAT_docdb&KIND=A1&LOCALE=en_EP&NUMBER=1069023&OPS=ops.epo.org&SRCLANG=fr&TRGLANG=en.

Machine translation of description DE102007028201. European Patent Office: Espacenet Patent Search. Jan. 26, 2014. http://translationportal.epo.org/emtp/translate/?ACTION=description-retrieval&COUNTRY=DE&ENGINE=google&FORMAT=docdb&KIND-A1&LOCALE=en_EP&NUMBER=102007028201&OPS=ops.epo.org&SRCLANG=de&TRGLANG=en.

U.S. Appl. No. 13/526,680, filed Jun. 19, 2012.

* cited by examiner

STEERING WHEEL FOR A MOTOR VEHICLE AND PROCESS FOR PRODUCING A STEERING WHEEL

CROSS-REFERENCE TO RELATED APPLICATION

This application is a continuation of U.S. application Ser. No. 13/526,680 filed Jun. 19, 2012 and published in the English language, which claims benefit under 35 USC § 119 to German Patent Application No. 10 2011 104 994.4 filed Jun. 22, 2011, the entire disclosures of which are incorporated herein by reference.

TECHNICAL FIELD OF THE INVENTION

The invention concerns a steering wheel for a motor vehicle with a steering wheel base body and a jacket that comprises at least one strip surrounding the steering wheel base body on the outer circumference. A first free end of the at least one strip is held in position securely in a groove formed in the steering wheel base body. In addition, the invention concerns a process for producing such a steering wheel.

DESCRIPTION OF THE RELATED ART

DE 10 2007 028 201 A1 describes a leather-jacketed steering wheel. Two strips of leather are sewn together at a first end. In order to achieve an especially good positioning ability of the two leather strips on the steering wheel rim, the sewn-together ends of the two leather strips are clamped in a groove that is formed along the steering wheel rim in its circumferential direction extending around the hub of the steering wheel. After placing the sewn-together ends into the groove, the leather strips are then placed on the surface of the steering wheel rim on its outer circumference. Then, the free ends of the two leather strips are connected by means of a seam.

Also, it is known from prior art to provide only one leather strip for enclosing the steering wheel rim, with the width of the strip corresponding essentially to $2\pi r$, and r being the radius of a cross-sectional surface of the steering wheel rim. The length of the leather strip corresponds to the length of the steering wheel rim in the direction that extends around the hub of the steering wheel. On its two ends, this leather strip receives a pre-stitched seam. When the leather strip is then placed around the steering wheel rim, its facing edges form a butt joint. The stitches of the pre-stitched seam are then connected with each other. The connecting seam to be used for this, for example an Indianapolis seam, is produced by hand because a sewing machine cannot be used when the leather strip is arranged on the steering wheel rim. Even with steering wheel jackets where the steering wheel rim does not have a pure torus shape and where, as a consequence, the strip has a complex basic form, it is usually necessary to sew together the two free ends of the strip on the steering wheel manually.

This hand sewing of the jacket of a steering wheel is very labor intensive and therefore very costly.

SUMMARY OF THE INVENTION

This invention therefore addresses the problem of creating a steering wheel and a process as described above that lends itself to a much less costly production.

Advantageous embodiments with practical developments of the invention are given in the related claims.

With the motor vehicle steering wheel according to the invention, a steering wheel base body and a jacket are provided, with the jacket comprising at least one leather strip surrounding the steering wheel base body on its outer circumference. A first free end of the at least one strip is held in position securely in a groove formed in the steering wheel base body. A second free end of the at least one strip is also held in position securely in a groove formed in the steering wheel base body. This means that, after the placement of the jacket on the steering wheel base body, none of the ends of the strip need to be sewn together by hand; rather, the insertion of the ends into the at least one groove ensures the fixed position of the jacket on the steering wheel base body.

The at least one strip of the jacket is placed on the steering wheel base body so that it surrounds said body on its outer circumference and is held in position on the steering wheel base body by the clamping of its ends in the at least one groove. Since this eliminates the step of sewing together the jacket on the steering wheel, the production of the steering wheel is an especially low-cost operation.

In an advantageous embodiment of the invention, the jacket comprises a single strip, and the two free ends of the strip are held in one and the same groove. Such an attachment of the jacket to the steering wheel base body is distinguished by especially low cost. A (decorative) seam that is necessary for steering wheel jackets known from prior art is thereby completely eliminated.

A cosmetically especially attractive design of the steering wheel can be achieved when, according to another advantageous embodiment of the invention, the jacket comprises at least one first strip and at least one second strip. Here, the first free ends of the two strips are held in a first groove and the second free ends of the two strips are held in a second groove. Here, too, the jacket is fixed in position on the steering wheel base body by the insertion of the free ends in the associated groove, without manual sewing operations having to be performed on the steering wheel. In alternative embodiments, even more than two strips may be provided whose ends are fixed in associated grooves extending around the steering wheel rim in the circumferential direction of the steering wheel rim around the hub of the steering wheel.

It also proved to be advantageous if the free ends of the two strips held in a common groove were equipped with at least one mechanically sewn decorative seam. This decorative seam can be produced with a sewing machine prior to the insertion of the two ends into the groove so that a decorative seam will then be present on the steering wheel, as is the case with a decorative seam produced manually. After the mechanical sewing of the decorative seam (e.g., one or more portions of thread that may be sewn through the free ends of the two strips), the free ends of the two strips carrying the decorative seam are then inserted into the common groove. This insertion of the free ends into the groove attaches the jacket to the steering wheel base body. In this 4 way, various and complex decorative patterns can be provided on the jacket without having to produce them manually.

In addition, or as an alternative, the free ends of the two strips held in a common groove may be connected with at least one braid arranged in the common groove. Such a decorative braid, i.e. a strip folded once, will produce a cosmetically very attractive appearance of the steering wheel if it is implemented in a different color. The connection of the free ends of the two strips with the braid can be accomplished by means of mechanical sewing, i.e. before the jacket is attached to the base body of the steering wheel.

In order to improve the hold of the ends of the at least one strip in the associated groove, an adhesive may be provided. This adhesive may be arranged in the groove at least sectionally.

If, additionally or alternatively, adhesive is applied at least to sections of the steering wheel base body and/or to the inside of the jacket, the result is an especially secure attachment of the jacket to the steering wheel base body.

Lighting elements such as LEDs, luminous strips, etc. may be integrated in the groove and may be used for a decorative illumination of the surroundings of the steering wheel.

In the process according to the invention for producing a steering wheel for a motor vehicle, a steering wheel base body is equipped with a jacket that comprises at least one strip surrounding the steering wheel base body on its outer circumference. A first free end of the at least one strip is fixed in a groove that is formed in the steering wheel base body. A second free end of the at least one strip is also fixed in a groove that is formed in the steering wheel base body. Such an arrangement of the jacket on the steering wheel base body is an especially low-cost feature because sewing of the strip by hand is not required.

The advantages and preferred embodiments described above for the steering wheel according to the invention also apply to the process according to the invention for the production of a steering wheel.

The characteristics and combinations of characteristics referred to above in the description, as well as the characteristics and combinations of characteristics referred to below in the description of the figures and/or shown by themselves in the figures can be used not only in the specific combination referred to but also in other combinations or by themselves, without going beyond the scope of the invention.

Additional advantages, characteristics, and details of the invention follow from the claims, the description of preferred embodiments below, as well as from the figures in which identical or functionally equivalent elements are identified by identical reference symbols.

DETAILED DESCRIPTION OF THE INVENTION

Figure 1:
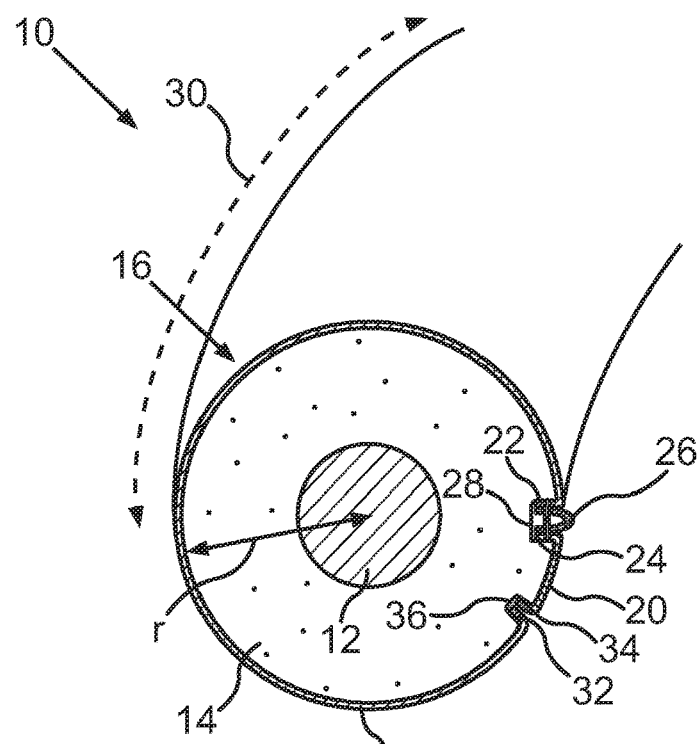
FIG. 1 shows a perspective, schematic section view of a steering wheel rim of a steering wheel where the free ends of two leather strips are held in associated grooves that are formed in the base body of a steering wheel rim extending in the circumferential direction of the steering wheel rim around the hub of the steering wheel.

FIG. 1 shows a schematic and simplified view of a steering wheel rim 10 of a steering wheel for a motor vehicle. The steering wheel rim 10 comprises a bearing structure 12 made of metal, for example an aluminum alloy, that is enclosed by a synthetic material, specifically a foam material 14. The base body of the steering wheel rim formed in this way has a radius r.

On its outer circumference, the base body is surrounded by a leather jacket 16 that comprises a first leather strip 18 and a second leather strip 20 in the embodiment shown in FIG. 1. A first free end 22 of the first leather strip 18 and a first free end 24 of the second leather strip 20 are sewn to a decorative braid 26. These two free ends 22, 24 and the decorative braid 26 are held in a groove 28 that is formed in the foam material 14 of the base body of the steering wheel rim 10. The groove 28 extends in a circumferential direction of the steering wheel rim 10 around a hub (not shown) of the steering wheel, with this circumferential direction identified by the double arrow 30 in FIG. 1.

A second free end 22 of the first leather strip 18 and a second free end of the second leather strip 20 are held in a second groove 36 that is arranged parallel to the first groove 28 in the base body of the steering wheel rim 10. This second groove 36 is also formed in the foam material 14 of the base body of the steering wheel rim 10.

Figure 2:
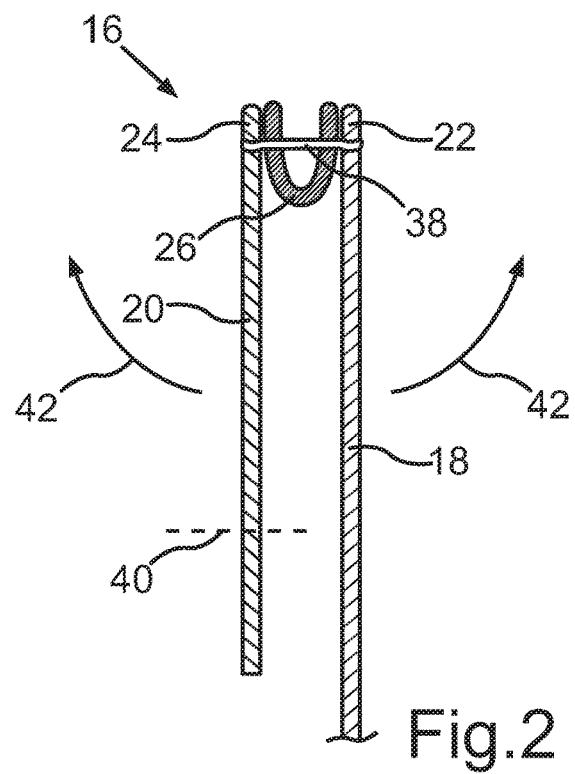
FIG. 2 shows the two leather strips whose first free ends are sewn to a decorative braid, prior to the arrangement of the two ends in one of the two grooves provided in the base body of the steering wheel rim.

During the production of the steering wheel, the two free ends 22, 24 of the two leather strips 18, 20 are first sewn to the decorative braid 26 (see FIG. 2). This is done before the two free ends 22, 24 are inserted into the first groove 28. The width of the two leather strips 18, 20 is selected so that it is easy to produce, by means of a sewing machine, a seam 38 (e.g., one or more portions of thread that may be sewn through the free ends of the two strips) that connects the leather strips 18, 20 with the decorative braid.

Figure 3:
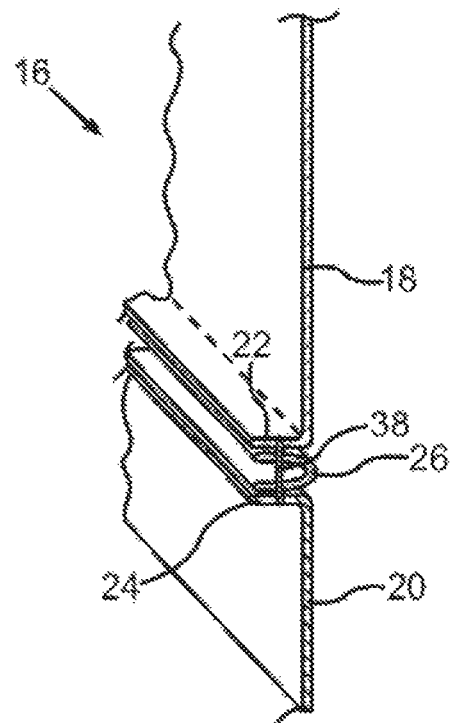
FIG. 3 shows the two ends of the leather strips connected with the decorative braid that form a seam that can be inserted into the groove.

After that, the narrow leather strip 20 is cut to the intended width. A mark 40 in FIG. 2 schematically indicates the place where the cutting is performed. Also, the wider leather strip 18 that surrounds the larger part of the base body of the steering wheel rim 10 is cut to the correct width, in such a way that the second free ends 32, 34 of the two leather strips 18, 20 can be inserted into the second groove 36. The arrows 42 in FIG. 2 illustrate the placement of the two leather strips 18, 20 that is performed in such a way that the first two free ends 22, 24 of the leather strips 18, 20 form a seam in conjunction with the decorative braid 26 (see FIG. 3).

After the cutting, the narrow leather strip 20 and the wider leather strip 18 have the correct width for jacketing the base body of the steering wheel rim 10. As can be seen from FIG. 3, the seam including the decorative braid 26 can then be inserted into the first groove 28 intended for this purpose.

Then, the two leather strips 18, 20 are placed around the base body of the steering wheel rim 10 in such a way that their free ends 32, 34 are located in the area of the second groove 36 (see FIG. 1). The two free ends 32, 34 are then clamped in the second groove 36 into which adhesive has been placed. In this way, it is possible to attach the leather jacket 16 to the base body of the steering wheel rim 10 without having to produce a seam by hand on the steering wheel.

Figure 4:
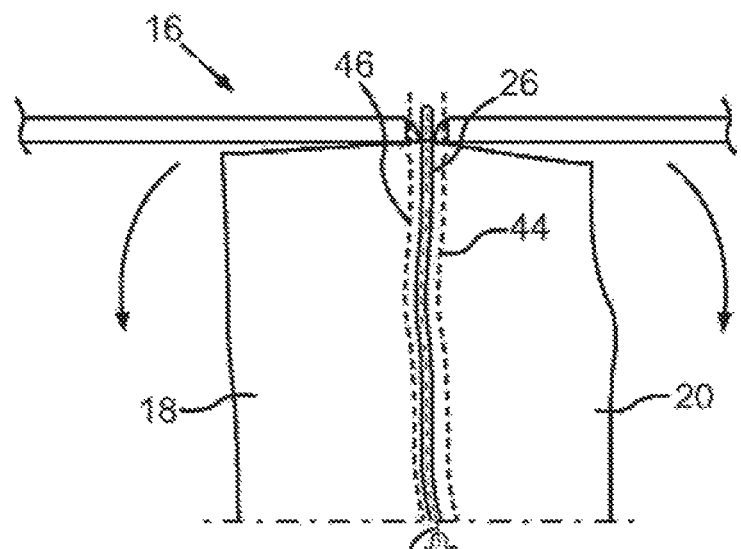
FIG. 4 shows a top view of the two leather strips each of which has—in addition to the decorative braid—a decorative seam at their end intended for insertion into the groove.

In the leather jacket 16 for the steering wheel rim 10 shown in FIG. 4, a decorative seam 44, 46 is provided in addition to the decorative braid 26 on the two leather strips 18, 20 in the area of their ends 22, 24 that are to be held in the groove 28. These decorative seams 44, 46 (e.g., one or more portions of thread that may be sewn through the free ends of the two strips, as shown in Fig. 4) are also produced mechanically prior to the attachment of the leather jacket 16 to the base body of the steering wheel rim 10. It 8 is also possible to produce just one or several decorative seams rather than the two decorative seams 44, 46 shown here by way of an example, and the decorative braid 26 may be eliminated.

Figure 5:
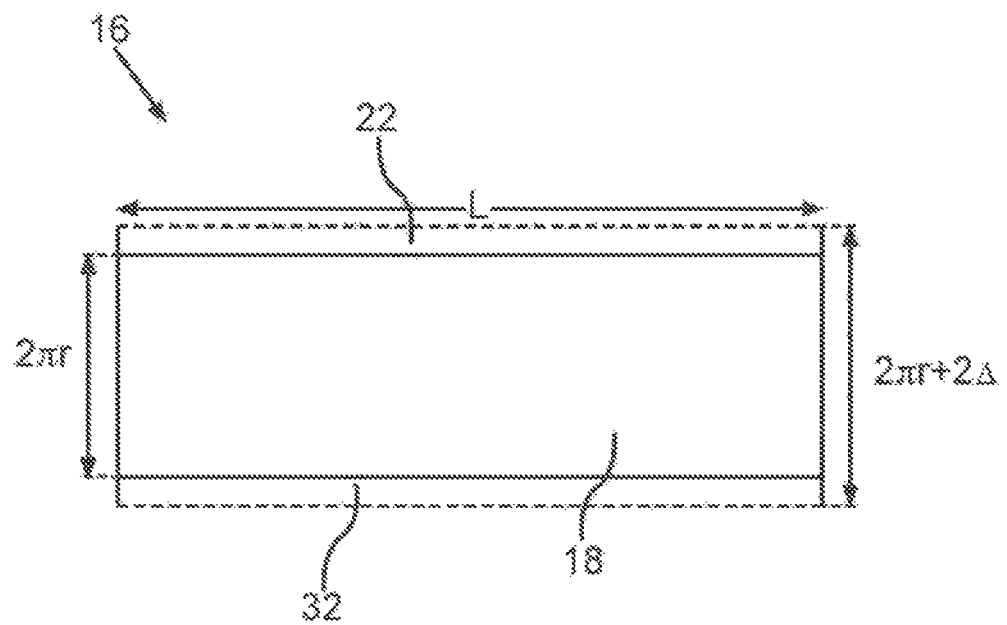
FIG. 5 shows a greatly simplified cutting of a single leather strip for jacketing a steering wheel rim whose base body comprises only one groove extending in the circumferential direction of the steering wheel rim around the hub of the steering wheel.

In another leather jacket 16 shown in FIG. 5, only the first leather strip 18 is provided for jacketing the base body of the steering wheel rim 10. Here, the length L corresponds to the outer circumference of the steering wheel rim 10 in the direction extending around the hub of the steering wheel, indicated in FIG. 1 by the double arrow 30.

Here, the width of the leather strip 18 is larger by the width of the two free ends 22, 32—i.e. by 2Δ—than the circumference 2πr of the base body of the steering wheel rim 10. This makes it possible to insert the free ends 22, 32 into the common groove 36 that is provided in the foam material 14 of the base body of the steering wheel rim 10. By fixing the two free ends 22, 32 of the leather strip 18 that are clamped in the groove 36, it is possible here, too, to eliminate the need for manual sewing of the leather strip 18 on the steering wheel. Since no decorative seam is provided in this embodiment, the groove 28 can be eliminated.

It is possible to apply an adhesive to the common groove 36 as well as to areas of the surface of the base body of the steering wheel rim 10 that face the leather jacket 16 in order to improve the attachment of the leather jacket 16 to the base body of the steering wheel rim 10.

Figure 6:
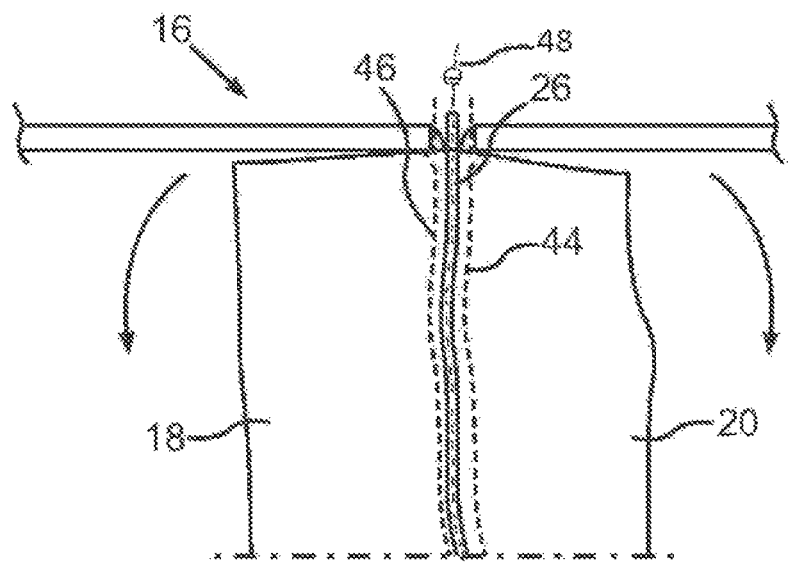
FIG. 6 shows a top view of the two leather strips in combination with LED lights.

In the groove 28, ambient lighting may be integrated, for example in the form of a luminous strip 47 (schematically shown in FIG. 4) or in the form of one (or several side-by-side) LED lights 48 (schematically shown in FIG. 6). This opens new possibilities for the illumination of the interior of a vehicle as well as—very generally—for the design of the interior that were not achievable before.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A steering wheel for a motor vehicle, including:
a steering wheel base body having an outer circumference; and
a jacket that includes:
at least two strips surrounding the steering wheel base body on the outer circumference, with a first free end of the at least two strips being held in position in a common first groove formed in the steering wheel base body, and with a second free end of the at least two strips held in position and secured in a second groove formed in the base body of the steering wheel, and
the first free ends being held in the first groove of the at least two strips are connected with a mechanically-sewn functional seam and the second free ends of the at least two strips are clamped in the second groove, and
wherein the at least two strips are equipped with at least one mechanically-sewn decorative seam proximate at least one of the first free ends, and
wherein the mechanically-sewn functional seam is separate from the at least one mechanically-sewn decorative seam.

2. The steering wheel according to claim 1, wherein the at least one mechanically-sewn decorative seam is circumferentially offset from the mechanically-sewn functional seam.

3. The steering wheel according to claim 1, wherein the common first groove is wider than a combined thickness of the first free ends.

4. The steering wheel according to claim 1, further including an adhesive in the second groove, wherein the second free ends of the at least two strips are held in the second groove by the adhesive.

5. The steering wheel according to claim 1, wherein a lighting element is integrated in the common first groove.

6. The steering wheel according to claim 1, wherein the at least one mechanically-sewn decorative seam includes a first portion of a thread that is mechanically sewn through at least one of the first free ends of the at least two strips.

7. The steering wheel according to claim 1, wherein the mechanically-sewn functional seam includes a thread that is sewn through the first free ends of the at least two strips.

8. The steering wheel according to claim 7, wherein the thread of the mechanically-sewn functional seam is sewn through the first free ends of the at least two strips and an element to connect the first free ends.

9. The steering wheel according to claim 1, wherein the second free ends are clamped in the second groove to fixedly attach the jacket to the steering wheel base body.

10. A process for the production of the steering wheel of claim 1 including the steps of:
mechanically sewing the first free ends of the at least two strips to form the jacket;
equipping at least one of the at least two strips with the at least one mechanically sewn decorative seam proximate its first free end;
placing the first free ends into the common first groove;
encasing the steering wheel base body with the jacket so that the first free ends are held in position in the first groove, and thereafter the second free ends of the at least two strips are held in position along the outer circumference from the common first groove toward the second groove; and
securing the second free ends in the second groove.

11. A process for the production of a steering wheel for a motor vehicle including the steps of:
mechanically sewing first free ends of at least two strips to form a jacket;
equipping at least one of the at least two strips with at least one mechanically sewn decorative seam proximate its first free end;
placing the first free ends into a common first groove formed in a steering wheel base body of the steering wheel, the steering wheel base body having an outer circumference;
encasing the steering wheel base body with the jacket so that the first free ends are held in position in the first groove, and thereafter second free ends of the at least two strips are held in position along the outer circumference from the common first groove toward a second groove formed in the base body of the steering wheel; and
securing the second free ends in the second groove, and wherein the mechanically sewing of the first free ends of at the least two strips includes connecting the first free ends of the at least two strips with a mechanically-sewn functional seam separate from the at least one mechanically-sewn decorative seam.

12. The process according to claim 11, wherein the at least one mechanically-sewn decorative seam is circumferentially offset from the mechanically-sewn functional seam.

13. The process according to claim 11, wherein placing the first free ends includes placing the first free ends in the common first groove, which is wider than a combined thickness of the first free ends.

14. The process according to claim 11, wherein a lighting element is integrated in the first groove during sewing.

15. The process according to claim 11, wherein the equipping of the at least one of the at least two strips with the at least one mechanically-sewn decorative seam includes sewing a first portion of a thread, of the at least one mechanically-sewn decorative seam, through at least one of the first free ends.

16. The process according to claim 15, wherein the equipping of the at least one of the at least two strips with the at least one mechanically-sewn decorative seam includes a sewing machine sewing the first free ends of the at least two strips with the at least one mechanically-sewn decorative seam.

17. The process according to claim 11, wherein the mechanically sewing of the first free ends of the at least two strips includes sewing a thread of the mechanically-sewn functional seam through the first free ends of the at least two strips.

18. The process according to claim 17, wherein the mechanically sewing of the first free ends of the at least two strips includes sewing a thread of the mechanically-sewn functional through the first free ends and an element to connect the element to the first free ends.

19. The process according to claim 11, wherein securing the second free ends in the second groove includes clamping the second free ends in the second groove to fixedly attach the jacket to the steering wheel base body.

* * * * *